United States Patent [19]

Bartholomew et al.

[11] Patent Number: 4,724,681
[45] Date of Patent: Feb. 16, 1988

[54] PORTABLE, WHEELED COOLER APPARATUS

[76] Inventors: Alan E. Bartholomew, 509 Rolling Hills Dr., Newton, Kans. 67114; John L. Miller, 505 N. Rock Rd., Apt. 1114, Wichita, Kans. 67206

[21] Appl. No.: 940,787

[22] Filed: Dec. 11, 1986

[51] Int. Cl.⁴ ............................................. B60H 1/32
[52] U.S. Cl. ......................................... 62/239; 62/457; 190/18 A; 280/47.17
[58] Field of Search ............... 190/115, 117, 116, 118, 190/18 A; 62/239, 457, 464; 280/47.17, 47.37

[56] References Cited

U.S. PATENT DOCUMENTS

| | | | |
|---|---|---|---|
| 2,392,926 | 1/1946 | Kelly | 280/47.17 X |
| 2,851,180 | 9/1958 | McCabe | 280/47.37 R |
| 3,308,633 | 3/1967 | Kritzer, Jr. | 62/239 |
| 3,591,194 | 7/1971 | Vega | 62/457 X |
| 4,273,222 | 6/1981 | Cassimally et al. | 190/18 A |
| 4,581,902 | 4/1986 | Starck et al. | 62/457 X |

Primary Examiner—Lloyd L. King
Attorney, Agent, or Firm—Phillip A. Rein

[57] ABSTRACT

This invention relates to a portable, wheeled cooler apparatus having a (1) cooler chest assembly; (2) support wheel assembly on which the cooler chest assembly is mounted; and (3) a combination handle and lock assembly connected to the cooler chest assembly to act as a lock in an enclosed condition and as a handle in a transport condition. The cooler chest assembly includes a support container member with a removable enclosure lid member mounted thereon. The support wheel assembly is operable in an upright condition of the cooler chest assembly to restrict lateral movement thereof as having support wheel members out of contact with a support surface. The cooler chest assembly is pivotal rearwardly out of contact with the support surface for ease of movement on the wheel members. The combination handle and lock assembly is provided with first and second handle sections which are operable (1) in one condition to hold the enclosure lid member against the support container member; and (2) in an extended, aligned condition to form a rigid handle assembly for movement of the entire cooler chest assembly. The combination handle and lock assembly is provided with detent lock members to releasably anchor the first wall handle section to the support container member and, additionally, to the second wall handle section in the extended condition.

11 Claims, 8 Drawing Figures

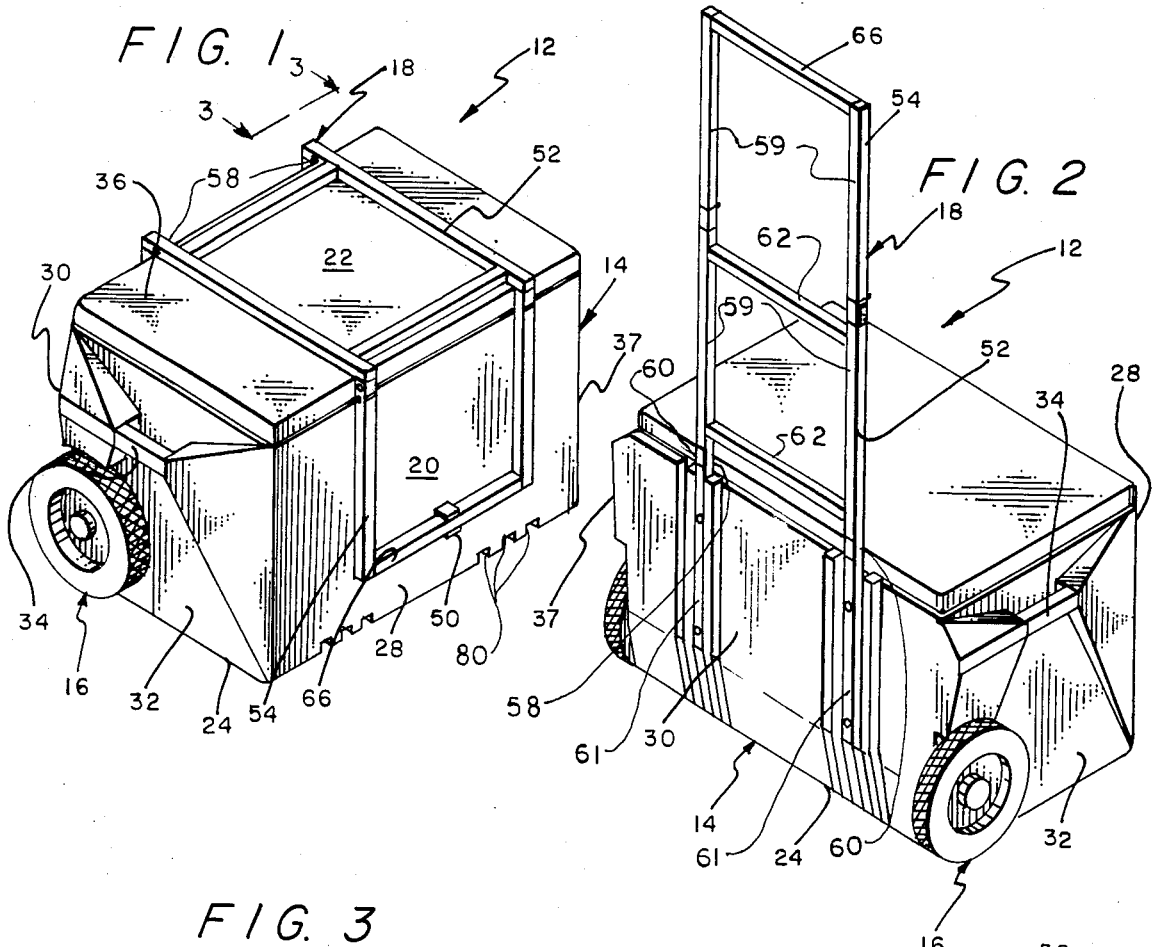
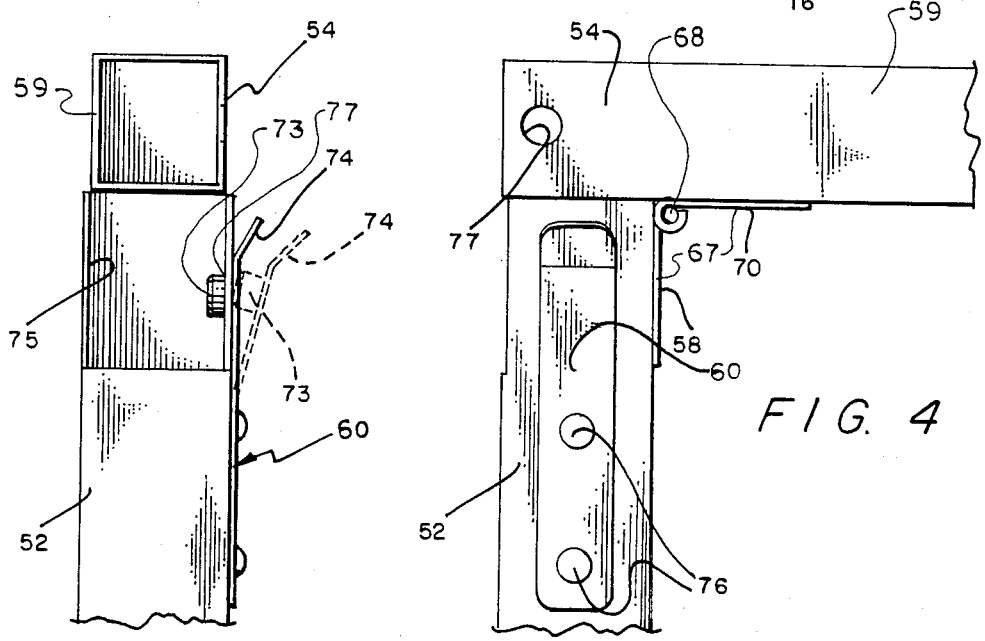

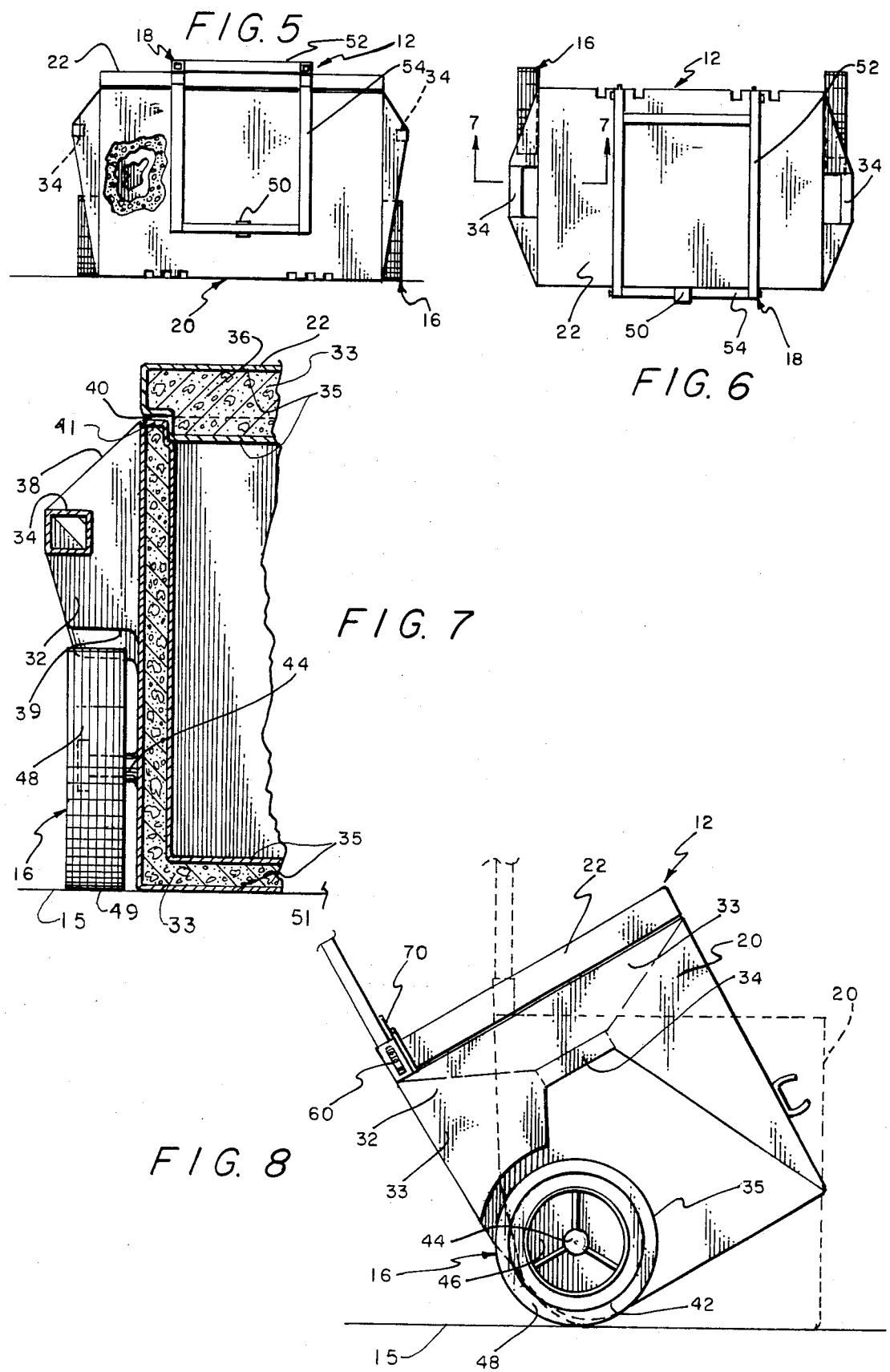

4,724,681

PORTABLE, WHEELED COOLER APPARATUS

PRIOR ART

A patentability investigation on this invention has revealed the following United States Patents:

| U.S. Pat. No. | Invention | Inventor |
| --- | --- | --- |
| 2,883,731 | BUDDY CART | Wells |
| 3,591,194 | ICE CHEST CART | Vega |
| 4,242,874 | ICEBOX CONVERSION UNIT | Simms |
| 4,300,356 | REFRIGERATION STORAGE ASSEMBLY | Notaro |
| 4,319,629 | CONSTANT TEMPERATURE BOX | Hotta |
| 4,375,758 | PORTABLE ICE TABLE | Simmons |

The Wells patent discloses a cart structure having handles and wheel members mounted thereon but substantially different in appearance to our invention.

The Hotis reference discloses a conventional constant temperature ice chest type box but therein the similarities cease.

The Vega patent discloses a rectangular type ice chest cart having a lid thereon with spaced wheel members and a moveable handle member. However, the Vega device does not teach the applicant's features of the covered spaced wheel members and a handle structure movable to a folded condition in order to lock a lid member in a closed condition.

Therefore, it is believed that the portable, wheeled cooler apparatus of this invention contains numerous features therein which would be patentable over the noted United States Patent references.

PREFERRED EMBODIMENT OF THE INVENTION

In one preferred embodiment of this invention, a portable, wheeled cooler apparatus is provided utilizing (1) a generally rectangular cooler chest assembly; (2) a support wheel assembly having the cooler chest assembly mounted thereon; and (3) a combination handle and lock assembly secured to the cooler chest assembly operable to provide a transporting handle function and a cooler lid member lock feature. The cooler chest assembly is provided with a support container member of generally rectangular shape to hold ice and items therein and a enclosure lid member releasable mounted on the support container member. The support container member is provided with parallel end walls each having a handle structure thereon for grasping, elevating, and placing into the trunk of a vehicle or the like. The support wheel assembly is provided with a pair of spaced wheel members interconnected by a support shaft. The wheel members are placed in indentations in the end walls of the support container member so as to utilize a minimum amount of space for storage and transporting thereof. The combination handle and lock assembly includes an elongated interconnected first wall handle section and second wall handle section which are pivotally connected at one end to the cooler chest assembly. The combination handle and lock assembly operable in (1) an aligned, elongated condition to provide a rigid handle structure for ease of transport and movement of the cooler chest assembly similar to that of a hand dolly structure; and (2) foldable into a locked condition over the closure lid member so as to seal and anchor in an enclosed cooling condition.

OBJECTS OF THE INVENTION

One object of this invention is to provide a portable, wheeled cooler apparatus which is compact in structure having recessed wheel members and a combination handle and lock assembly which is movable from usage to locked conditions.

One other object of this invention is to provide a portable, wheeled cooler apparatus being of a modernistic design with high insulation characteristics and able to be easily moved while carrying a heavy load therein.

Still, one further object of this invention is to provide a portable, wheeled cooler apparatus having a cooler chest assembly mounted on a support wheel assembly for ease of movement when in a rearwardly tilted condition with a foldable combination handle and lock assembly similar to a hand dolly structure.

Still, one other object of this invention is to provide a portable, wheeled cooler apparatus having a folded handle assembly which functions both as (1) extendably in an upright position for ease of tilting and movement of the entire cooler apparatus; and (2) foldable downward over an enclosure lid member to seal the same for energy efficient purposes and lockable to limit access thereto.

Still, another object of this invention is to provide a portable, wheeled cooler apparatus which is sturdy in construction; attractive in appearance; easy to move and manipulate on a support wheel assembly; and foldable into an enclosed locked condition requiring a minimum amount of space for storage or transporting purposes.

Various other objects, advantages, and feature of the invention will become apparent to those skilled in the art from the following discussion, taken in conjunction with the accompanying drawings, in which:

FIGURES OF THE INVENTION

FIG. 1 is a perspective view of the portable, wheeled cooler apparatus of this invention;

FIG. 2 is another perspective view of the portable, wheeled cooler apparatus of this invention illustrating a combination handle and lock assembly in an upright extended condition;

FIG. 3 is an enlarged fragmentary view taken along line 3—3 in FIG. 1 of a portion of the combination handle and lock assembly in the the folded condition;

FIG. 4 is a fragmentary side elevation view of the combination handle and lock assembly illustrated in FIG. 3.

FIG. 5 is a front elevational view3 of the portable, wheeled cooler apparatus of this invention having a portion broken away to illustrate the construction of a typical insulated sidewall;

FIG. 6 is a top plan view of the portable, wheeled cooler apparatus of this invention;

FIG. 7 is an enlarged fragmentary sectional view taken along line 7—7 in FIG. 6; and FIG. 8 is a fragmentary side elevational view of the portable, wheeled cooler apparatus of this invention shown in a tilted transport condition and further illustrated in dotted lines in an upright usage position.

The following is a discussion and description of preferred and specific embodiments of the new portable, wheeled cooler apparatus of this invention, such being made with reference to the drawings, whereupon the same reference numerals are used to indicate the same or similar parts and/or structure. It is to be understood that such discussion and description is not to unduly limit scope of the invention.

DESCRIPTION OF THE INVENTION

On referring to the drawings in detail and in particular FIG. 1, a portable, wheeled cooler apparatus of this invention, indicated generally at 12, is shown in the enclosed folded condition for transporting and/or storage. The portable, wheeled cooler apparatus 12 consists of (1) a generally rectangular cooler chest assembly 14 to hold items to be cooled therein; (2) a support wheel assembly 16 to receive the cooler chest assembly 14 thereon for movement over a support surface 15; and (3) a combination handle and lock assembly 18 operable to be moved from the enclosed locked condition as shown in FIG. 1 to an extended transport position as shown in FIG. 2.

The cooler chest assembly 14 includes a support body or container member 20 having a releasable enclosure lid member 22 mounted thereon. The support container member 20 is generally of a box rectangular shape having a bottom wall 24 with integral, spaced parallel side walls 28, 30 connected to the bottom wall 24; and end walls 32, 34 integral with the bottom wall 24 and adjacent portions of the side walls 28, 30.

As noted in FIGS. 5 and 7, the bottom wall 24, side walls 28, 30 and end walls 32, 37 are provided with an insulation material 33 mounted within spaced wall sections 35 thereof so as to achieve a high insulating characteristic to the cooler chest assembly 14.

The enclosure lid member 22 is provided with a main body section 36; stepped side wall sections 34 about the outer periphery of the main body section 36; and the insulation material 33 sandwiched between upper and lower wall sections 35 as noted in FIG. 7. A stepped side wall section 40 is adapted to be engagable and placed over an upper wall portion 41 on the upper periphery of the support container member 20 so as to provide a locked and sealed condition and prevent unintentional, lateral movement of the enclosure lid member 22.

The end walls 32 and 37 are each provided with (1) a tapered wall section 38; (2) a handle member 34 extended between the tapered wall sections 38; and (3) a wheel cutout section 39. Each wheel cutout section 39 is extended inwardly from an outer portion of the respective tapered wall sections 38 and the handle member 34 so that wheel members of the support wheel assembly 16 are protected and do not catch on other items when stored in the trunk of a vehicle or the like.

The support wheel assembly 16 includes a pair of spaced, parallel wheel members 42 interconnected by a main support shaft 44. Each wheel member 42 is provided with a wheel support hub 46 mounted on a respective tire member 48. The support shaft 44 is extended through openings the rearward sidewall 30 and rotatable in bearing members (not shown) a conventional manner.

It is noted that the wheel members 42 are adapted to be placed within the respective wheel cutout sections 39 with a lower surface 49 of the respective tire members 48 substantially in line with a bottom surface 57 of the bottom wall 24 of the support container member 28 as noted in FIG. 7. This position of the support shaft 44 and the outer surface 49 of the tire member 48 and bottom surface 51 of the cooler chest assembly 14 maintains the entire portable, wheeled cooler apparatus 12 in a non-moving condition as shown in FIG. 5. When the cooler chest assembly 14 is tilted rearwardly as shown in dotted lines in FIG. 8, the entire portable, wheeled cooler apparatus 12 is supported on the outer surface 49 of the tire members 48 for transporting and movement over the support surface 15.

The combination handle and lock assembly 18 includes (1) an anchor member 50 secured to the front sidewall 28 to clamp the entire cooler chest assembly 14 in a folded, locked condition; (2) a top or first wall handle section or assembly 52; (3) a side or second wall handle section or assembly 54 pivotally connected to the first wall handle section 52 (4) connector members 58 to pivotally interconnect the first wall handle section 52 to the cooler chest assembly 14 and, additionally, to the first wall handle section 52; and (5) detent lock members 60 to hold the handle sections 52, 54 in the extended, transport condition.

The first wall handle section 52 includes a pair of spaced, parallel support tubes 59 interconnected by spaced crossbar members 62 to provide a rigid framework. A lowest portion of the parallel support tubes 59 are pivotally connected through connector members 58 and detent lock emmbers 60 to an adjacent portion of the support chest assembly 14. This can be to parallel tube members 61 which will be an identical connection of the connector members 58 and the detent lock members 60 as the connection of the first wall handle section 52 to the second wall handle section 54 as shown in FIGS. 3 and 4 to be explained.

The side or second wall handle section 54 is constructed with a parallel pair of the upright, spaced parallel support tubes 59 which are interconnected by a top lock crossbar member 66 as noted in FIG. 2. the adjacent support tubes 59 on the handle sections 52, 54 are interconnected by conductor members 58 and detent lock members 60.

The upper lock crossbar member 66 is adapted to be inserted within the anchor member 50 in a snapped locked condition similar to a broom handle holder to secure in the folded condition as shown in FIGS. 1 and 5. The anchor member 50 could be a key actuated lock if more security or limited access to the cooler chest assembly 14 is desired.

The connector members 58 hinge members 70 which are pivotal in a conventional manner and a side view thereof is clearly shown in FIG. 4. Each hinge member 70 is provided with two connector sections 67 which are pivotal about a central pivot shaft 68 in a conventional manner.

Each detent lock member 60 includes (1) a clip member 74; (2) rivet members 76 to anchor to the clip member 74 to the respective support tubes 59; and (3) a lock stud 73 connected to and extended inwardly from the clip member 74. A detent lock member 60 may be provided at each location of the hinge members 70 if so desired.

Each adjacent support tube 59 is provided with a lock hole 77 to receive the respective ones of the lock studs 73 therein when in the locked extended condition.

As noted in FIG. 3, the respective ones of the support tubes 59 adjacent to the respective detent lock members 60 is provided with a cutout section 75 to allow the adjacent end portion of the support tubes 59 to be pivotally movable therein in an aligned condition of the support tubes 59. At this time, the respective lock studs 73 move into the aligned lock holes 77 to anchor the entire combination handle and lock assembly 18 in the extended condition as shown in FIG. 2.

USE AND OPERATION OF THE INVENTION

In the use and operation of the portable, wheeled cooler apparatus 12 of this invention, it is noted that an enclosed, locked condition is shown in FIG. 1 with the combination handle and lock assembly 18 in the folded condition. At this time, the second wall handle section 54 is folded downwardly over the front side wall 28 with the lock crossbar member 66 received within the anchor member 50. Due to the structural dimensions, this provides for a firm locking condition whereupon the first wall handle section 52 is placed against and tends to press the enclosure lid member 22 against the support container member 20 to provide an efficient seal thereabout to maintain heated or cooled temperatures within the insulated interior of the support container member 20.

It is noted that the respective wheel members 42 are within the respective wheel cutout sections 39 so as to have an outer surface of the tire members 48 within or aligned with an outer upright surface of the handle member 34 and tapered wall sections 33. This is desirable to achieve an attractive appearance and not interfer with the grasping and lifting of the portable, wheeled cooler apparatus 12 by the handle members 34 from a storage condition or from the trunk of a vehicle.

On utilization of the portable, wheeled cooler apparatus 12 to be transported along the support surface 15, it is obvious that the second wall handle section 54 may be grasped to move the lock crossbar member 66 from its connection to the anchor member 50 so as to be axially aligned with the first wall handle section 52. On movement to this condition, it is obvious that the clip members 74 mounted on the first wall handle section 52 are moved outwardly from within the respective lock holes 77. At this time, the second handle wall section 54 is moved into axial alignment with the first wall handle section 52 as noted in FIG. 2. After being placed in axial alignment, the respective clip members 74 are released so that the lock members 73 are moved within the aligned lock hole 77 to lock the handle sections 52, 54 in the extended position.

Concurrently, the first wall handle section 52 is moved upwardly so as to be in vertical alignment with support tube sections 61 which are secured to the back side wall 30 having detent lock members 60 mounted thereon. At this time, the lower clip members 74 are moved outwardly and the support tubes 59 of the top wall handle section 52 are moved into respective cutout sections 75 in the support tubess 61. At this time, the clip members 74 are released to extend the respective lock stud 73 within the aligned lock holes 77 in the adjacent support tubes 59, 61.

After this is accomplished, the entire combination handle and lock assembly 18 is in the extended condition as shown in Fig. 2 and presents a rigid structure similar to that of a hand dolly structure.

In this condition, it is obvious that the second wall handle section 54 can be grasped at the lock cross bar member 66 to tilt the cooler chest assembly 14 backwardly on the tire members 48 as noted in FIG. 8. Due to configuration of the support container member 20, this rearward tilting would pivot the bottom surface 51 of the cooler chest assembly 14 out of contact with the support surface 15. In this condition, it is obvious that the combination handle and lock assembly 18 is operable to move the cooler chest assembly 14 on the support wheel assembly 16 as desired thus without straining the person moving same.

In the condition of FIG. 2, it is obvious that the enclosure lid member 22 can be removed to gain access to the interior of the support container member 20 to add or remove ice or contents therefrom as so desired.

It is seen that the portable, wheeled cooler apparatus 12 of this invention is of a modernistic, compact design with the wheel members 42 hidden and enclosed within the wheel cutout sections 39 to provide an attractive appearance. The bottom wall 24 is provided with a plurality of parallel rib sections 80 for increased strength and an attractive appearance. The end walls 32, 37 are provided with the tapered wall sections 33; the handle members 34, and the wheel cutout sections 39 so as to be attractive in appearance.

The combination handle and lock assembly is provided with interconnected handle sections which are movable to a compact, folded, condition to hold the enclosure lid member against the support container member. Additionally, the handle sections are movable to axial alignment in the extended condition to act as a handle assembly for ease of movement of the cooler chest assembly of this invention.

The portable, wheeled cooler apparatus of this invention is attractive in appearance; sturdy in construction; easily movable through a handle member to various locations; and foldable to a compact condition for ease of storage and requiring a minimum amount of space therefore.

While the invention has been described in conjunction with preferred specific embodiments thereof, it will be understood that this description is intended to illustrate and not to limit the scope of this invention which is defined by the following claims.

We claim:

1. A portable, wheeled cooler apparatus adapted to be supported on and easily moved along a support surface, comprising;
   (a) a cooler chest assembly including a support container member having an enclosure lid member connected thereto to hold ice and/or other contents therein for insulating purposes;
   (b) a support wheel assembly connected to said cooler chest assembly operable for supporting on the support surface; and
   (c) a combination handle and lock assembly connected to an upright wall of said support container member of said cooler chest assembly and operable (1) in one position extended over said enclosure lid member and against another upright wall of said support container member to hold said cooler chest assembly in an enclosed, locked condition; and (2) in a second extended rigid condition to provide a handle assembly for ease of inclining and moving said cooler chest assembly by pulling or pushing on said support wheel assembly.

2. A portable, wheeled cooler apparatus as described in claim 1, wherein:
   (a) said cooler chest assembly includes said support container member having said enclosure lid member releasably connected thereto; and
   (b) said combination handle and lock assembly pivotally connected to said cooler chest assembly and movable over and against said enclosure lid member and releasably locked to said another upright wall to press against said support container member to provide sealing thereagainst.

3. A portable, wheeled cooler apparatus as described in claim 2, wherein:
(a) said combination handle and lock assembly includes an anchor member secured to said another upright wall of said support container member; a first wall handle section pivotally connected to said cooler chest assembly; and a second wall handle assembly pivotally connected to said first wall handle assembly and engagable with said anchor member in a locked condition so as to hold said enclosure lid member against said support container member.

4. A portable, wheeled cooler apparatus as described in claim 1, wherein:
(a) said combination handle and lock assembly includes a (1) first wall handle assembly pivotally connected to said upright wall of said cooler chest assembly at one end thereof;
(b) a second wall handle asembly pivotally at another end of said first wall handle assembly;
(c) said second wall handle assembly having a lock cross bar member; and
(d) an anchor member connected to said another upright wall of said cooler chest assembly to receive a portion of said lock cross bar member therein in a locked condition.

5. A portable, wheeled cooler apparatus as described in claim 1, wherein:
(a) said combination handle and lock assembly having connector members to pivotally connect a first wall handle section to a second wall handle section; and detent lock members connected to said cooler chest assembly and said first wall handle section so as to be operable to hold said first wall handle section and said second wall handle section in an aligned, rigid condition so that said combination handle and lock assembly is extended in a common plane and operable to pivot and move said cooler chest assembly from a first upright position supported on a bottom wall of said support container member to a second inclined position supported on said support wheel assembly for ease of movement thereof.

6. A portable, wheeled cooler apparatus adapted to be placed in a normal upright condition against movement on a support surface and pivotal to an inclined position for movement and transporting thereof, comprising:
(a) a cooler chest assembly having a support container member with an enclosure lid member releasably connected thereto;
(b) said support container member having a bottom wall supported on the support surface when in an upright condition;
(c) support wheel assembly having spaced wheel members and connected to said cooler chest assembly and operable in the inclined position to be readily movable on said wheel members and move said bottom wall out of contact with the support surface; and
(d) a combination handle and lock assembly connected to said cooler chest assembly and operable in one condition to anchor and surround said enclosure lid member against said support container member; and in a second condition to be extended in a common plane and pivotal rearwardly to pivot said cooler chest assembly to be supported only on said wheel members for movement thereof.

7. A portable, wheeled cooler apparatus as described in claim 6, whereupon:
(a) said combination handle and lock assembly includes a detent lock member having clip members connected to said first wall handle section and said second wall handle section; and
(b) said clip member movable against bias pressure having in said first wall handle section and said second wall handle section a lock stud engagable with lock holes so as to anchor said combination handle and lock assembly in the locked, rigid extended condition for transport thereof without lifting required.

8. A portable, wheeled cooler apparatus as described in claim 7, wherein:
(a) said support container member includes said bottom wall integral with respective parallel side walls and end walls;
(b) said end walls each having a tapered wall section; handle members mounted in said tapered wall sections; and a wheel cutout section to receive respective wheel members therein; and
(c) said wheel cutout sections to retain said wheel members inwardly of said handle member and an outermost portion of said tapered wall section to provide an attractive appearance and within the outer confines of said bottom wall and said end walls so as to not interfer with any other structure when placed into a trunk compartment or the like of a vehicle.

9. A portable, wheeled cooler apparatus as described in claim 6, wherein:
(a) said support container member includes spaced end walls each having a tapered wall section and a wheel cutout section to receive and enclosure respective ones of said wheel members therein to require a minimum amount of space for conveyance and storage.

10. A portable, wheeled cooler apparatus as described in claim 6 wherein:
(a) said support container member having spaced side walls; and
(b) said combination handle and lock assembly of generally U-shaped to contact said side walls and said enclosure lid member to secure same against said support container member in said one condition.

11. A portable, wheeled cooler apparatus adapted to be supported on and easily moved along a support surface, comprising:
(a) a cooler chest assembly to hold ice and/or other contents therein for insulating purposes;
(b) a support wheel assembly connected to said cooler chest assembly operable for supporting on the support surface;
(c) a combination handle and lock assembly connected to said cooler chest assembly and operable (1) in one position to hold said cooler chest assembly in an enclosed, locked condition; and (2) in a second extended condition to provide a handle assembly for ease of inclining and moving said cooler chest assembly on said support wheel assembly;
(d) said combination handle and lock assembly having connector members to pivotally connect a first wall handle section to a second wall handle section; and detent lock members connected to said cooler chest assembly and said first wall handle section so as to be operable to hold said first wall handle section and said second wall handle section in an aligned, rigid condition so that said combination handle and lock assembly is extended in a common plane and operable to pivot and move said cooler chest assembly; and (e) said detent lock members include clip members having laterally extended lock studs thereon movable within lock holes in adjacent portions of said first wall handle section and said second wall handle section so as to provide a locking feature of said lock studs within respective ones of said lock holes to anchor said first wall handle sections and said second wall handle sections in an aligned, rigid condition for transporting of said cooler chest assembly.

* * * * *